(12) United States Patent
Li et al.

(10) Patent No.: US 9,347,769 B2
(45) Date of Patent: May 24, 2016

(54) METHOD FOR ALIGNING A PHASE RETARDATION PLATE WITH A DISPLAY PANEL

(71) Applicant: BOE Technology Group Co., Ltd., Beijing (CN)

(72) Inventors: Wenbo Li, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 135 days.

(21) Appl. No.: 14/054,074

(22) Filed: Oct. 15, 2013

(65) Prior Publication Data

US 2014/0104612 A1 Apr. 17, 2014

(30) Foreign Application Priority Data

Oct. 15, 2012 (CN) .......................... 2012 1 0391735

(51) Int. Cl.

| | | |
|---|---|---|
| *G01J 4/00* | (2006.01) | |
| *G02F 1/1335* | (2006.01) | |
| *G02F 1/13* | (2006.01) | |
| *G02B 27/22* | (2006.01) | |
| *G02B 27/28* | (2006.01) | |
| *H04N 13/04* | (2006.01) | |
| *G01B 11/14* | (2006.01) | |
| *G01B 11/26* | (2006.01) | |

(52) U.S. Cl.
CPC ................ *G01B 11/14* (2013.01); *G01B 11/26* (2013.01)

(58) Field of Classification Search
CPC ................................ G01B 11/14; G01B 11/26

USPC ........ 356/364; 349/15, 194, 108; 359/489.07; 348/57
See application file for complete search history.

(56) References Cited

U.S. PATENT DOCUMENTS

| 7,538,876 | B2 * | 5/2009 | Hewitt ............... H04N 13/0443 |
|---|---|---|---|
| | | | 356/364 |
| 2004/0223093 | A1 * | 11/2004 | Nakayoshi et al. ............. 349/58 |
| 2011/0261299 | A1 * | 10/2011 | Tai et al. ........................ 349/98 |
| 2012/0162211 | A1 * | 6/2012 | Choi et al. .................... 345/419 |

FOREIGN PATENT DOCUMENTS

CN 102590922 A 7/2012

OTHER PUBLICATIONS

Rejection Decision issued by the Chinese Patent Office for Chinese Patent Application No. 201210391735.2 dated Jan. 23, 2015, four (4) pages.

(Continued)

*Primary Examiner* — Tarifur Chowdhury
*Assistant Examiner* — Sunghee Y Gray
(74) *Attorney, Agent, or Firm* — Ladas & Parry LLP

(57) ABSTRACT

An embodiment of the present invention provides a method for aligning a phase retardation plate with a display panel comprising the following steps: S1: determining the positions of a first reference line on the phase retardation plate and a second reference line on the display panel, wherein the first reference line is the central line between the first and second ends of the phase retardation area, and the second reference line is the central line between the third and fourth ends of the display area; S2: obtaining a positional deviation between the first reference line and the second reference line by calculation; S3: adjusting the relative position between the phase retardation plate and the display panel according to the positional deviation.

10 Claims, 7 Drawing Sheets

(56) References Cited

OTHER PUBLICATIONS

English translation of Rejection Decision issued by the Chinese Patent Office for Chinese Patent Application No. 201210391735.2 dated Jan. 23, 2015, four (4) pages.

First Office Action issued by the Chinese Patent Office for Chinese Patent Application No. 201210391735.2 dated Aug. 6, 2014, 3pgs.
English translation of First Office Action issued by the Chinese Patent Office for Chinese Patent Application No. 201210391735.2 dated Aug. 6, 2014, 3pgs.

\* cited by examiner

METHOD FOR ALIGNING A PHASE RETARDATION PLATE WITH A DISPLAY PANEL

BACKGROUND

An embodiment of the present invention relates to a method for aligning a phase retardation plate with a display panel.

Stereoscopic display has become a key trend in today's display industry. Generally speaking, a 3D image is created by application of parallax principles, wherein the left eye of a viewer receives only a left-eye image and his/her right eye receives only a right-eye image. Here, the left-eye and right-eye images are a pair of stereoscopic images with a parallax.

Serial I/O mode is one of the ways to achieve stereoscopic images, wherein at a first moment, a left-eye image is provided and can be seen only by the left eye of a viewer, and at a second moment, a right-eye image is provided and can be seen only by the right eye. Due to the retinal afterimage, the viewer feels like see both the left-image and right-eye image at the second frame, thus resulting in a three-dimensional image in the viewer's brain.

Parallel I/O mode is another way to achieve stereoscopic images, wherein at the same frame, a part of pixels are set to display a right-eye image and another part of pixels to display a left-eye image. By using a grating or polarized glasses, the right-eye image can be seen only by the right eye of a viewer, and the left-eye image can be seen only by the left eye, hence resulting in a three-dimensional image in the viewer's brain.

Stereoscopic image display device using polarized glasses has become a mainstream technology in today's display industry, wherein a phase retardation plate is provided at the front surface of a display panel, so as to adjust the polarization direction of emitted light. The phase retardation plate can be a risen phase retardation plate or a liquid crystal cell, or any other components for adjusting the polarization direction of light emitted from different parts of pixels. FIG. 1 is a schematic diagram of the principle of an existing 3D display technology. As shown in FIG. 1, there are, in front of the viewer, from the distant to the near, a display panel 10, a phase retardation plate 20, an emitted image 30, and a pair of polarized glasses 40. Left-eye images L and right-eye images R are displayed alternately on display panel 10. The phase retardation plate 20 is provided at the front surface of the display panel 10. Strip-shaped regions with phase retardation of $\lambda/2$ ($\lambda$ is the wavelength) and zero alternately are provided on the phase retardation plate 20. In this way, the polarizing direction of light emitted from the pixels in places corresponding to the $\lambda/2$ phase retardation regions will be rotated by 90 degrees. As a result, when a viewer wears the glasses 40 which contains a pair of polarizing filters with orthogonal polarization directions, light emitted from left-eye pixels is allowed only to be seen by the left eye, and light emitted from right-eye pixels is allowed only to be seen by the right eye, hence experiencing a 3D display image. Optionally, $\lambda/4$ phase retardation regions and $-\lambda/4$ phase retardation regions can be alternately provided on a phase retardation plate, so as to produce left-handed and right-handed circularly polarized light. In this case, a viewer can see a 3D image with glasses containing different circular polarizing filters (not shown in FIG. 1).

In the above-described 3D display technology, it is of vital importance to align the phase retardation plate 20 with the display panel 10. If any large misalignments exist, light emitted from left-eye pixels is for example turned into polarized light with orthogonal or opposite polarization directions after passing the phase retardation plate 20, resulting the left-eye images can be seen by both eyes. More severely, the left-eye images can only be seen by the right eye, while the right-eye images can only be seen by the left eye, resulting in serious image crosstalk and failure of creating a 3D image.

In an existing method of aligning an array substrate with a color filter substrate, four pairs of alignment marks, which can be detected by a image pickup device such as CCD image sensor, are provided on the four corners of both the array substrate and color filter substrate respectively, so as to assure the accuracy of the alignment. Since the alignment marks are formed of a colored metal or a black matrix (BM) mask, it is quite easy for a CCD image sensor to detect them. However, since in current stereoscopic display technology, oriented liquid crystal layer, for example, is often used as a phase retardation plate, it is improbable for an ordinary CCD image sensor to detect the structural information of the phase retardation plate, and as a result, impossible to align the phase retardation plate and a display panel in the way described as above. In an existing technology, the alignment of a phase retardation plate and a display panel can also be done manually, that is, the relative positions of a phase retardation plate and a display panel can be determined by a person's eyes, depending on his/her opinion on whether the 3D display effect is satisfactory or not. In addition, the screen also needs to be lightened up during the process. Therefore, such a manual alignment method is rather inefficient and inaccurate. It is necessary to develop, according to features of the products and display requirements, a new alignment method with enhanced accuracy and efficiency.

SUMMARY

An embodiment of the present invention provides a method for aligning a phase retardation plate with a display panel, wherein the phase retardation plate has a phase retardation area comprising a plurality of strip-shaped phase retardation regions sequentially arranged in a width direction, any two adjacent strip-shaped phase retardation regions are different in phase retardation, the display panel has a display area comprising a plurality of strip-shaped display regions respectively corresponding to the strip-shaped phase retardation regions of the phase retardation plate and a peripheral region outside the display area, a first end and a second end, in the width direction, of the phase retardation area of the phase retardation plate are correspond respectively to a third end and a fourth end of the display area of the display panel, comprising the following steps:

S1: determining the positions of a first reference line on the phase retardation plate and a second reference line on the display panel, wherein the first reference line is the central line between the first and second ends of the phase retardation area, and the second reference line is the central line between the third and fourth ends of the display area;

S2: obtaining a positional deviation between the first reference line and the second reference line by calculation;

S3: adjusting the relative position between the phase retardation plate and the display panel according to the positional deviation.

BRIEF DESCRIPTION OF THE DRAWINGS

In order to clearly illustrate the technical solutions of embodiments of the present invention, in the following, the accompanying drawings of the embodiments will be described briefly; it is obvious that the following description of the drawings only relates to some embodiments of the invention and thus not limitative of the invention.

DETAILED DESCRIPTION OF THE PREFERRED EMBODIMENTS

In the following, with reference to the accompanying drawings related to embodiments of the present invention, the technical solutions of the embodiments will be described in a clear and fully understandable way; it is obvious that the described embodiments are just one part but not all of the embodiments of the invention. Other embodiment(s) obtained by those skilled in the art, based on embodiments of the present invention, without any inventive work, all belong to the protection scope of the present invention.

An embodiment of the present invention provides a method for aligning a phase retardation plate with a display panel, which can considerably improve the accuracy of the alignment between the phase retardation plate and the display panel, hence reducing image crosstalk and achieving better 3D display effect.

Figure 1:
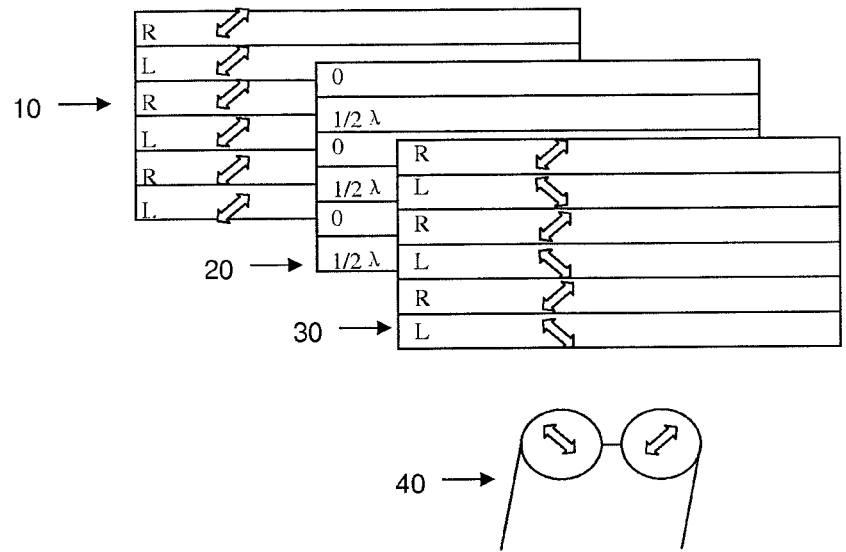
FIG. 1 is a schematic diagram illustrating the display principle of an existing 3D display technology.
Figure 2:
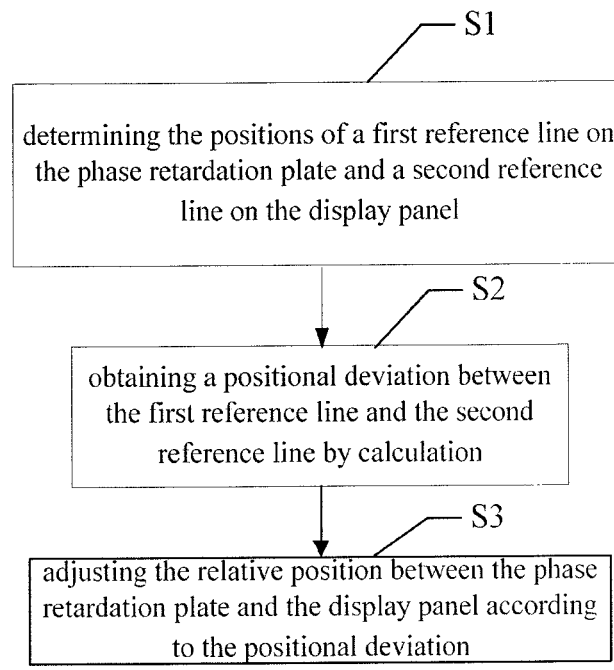
FIG. 2 is a flow chart illustrating the method for aligning a phase retardation plate with a display panel, in accordance with an embodiment of the present invention.

FIG. 2 shows a method for aligning a phase retardation plate with a display panel in accordance with an embodiment of the present invention.

Figure 3A:
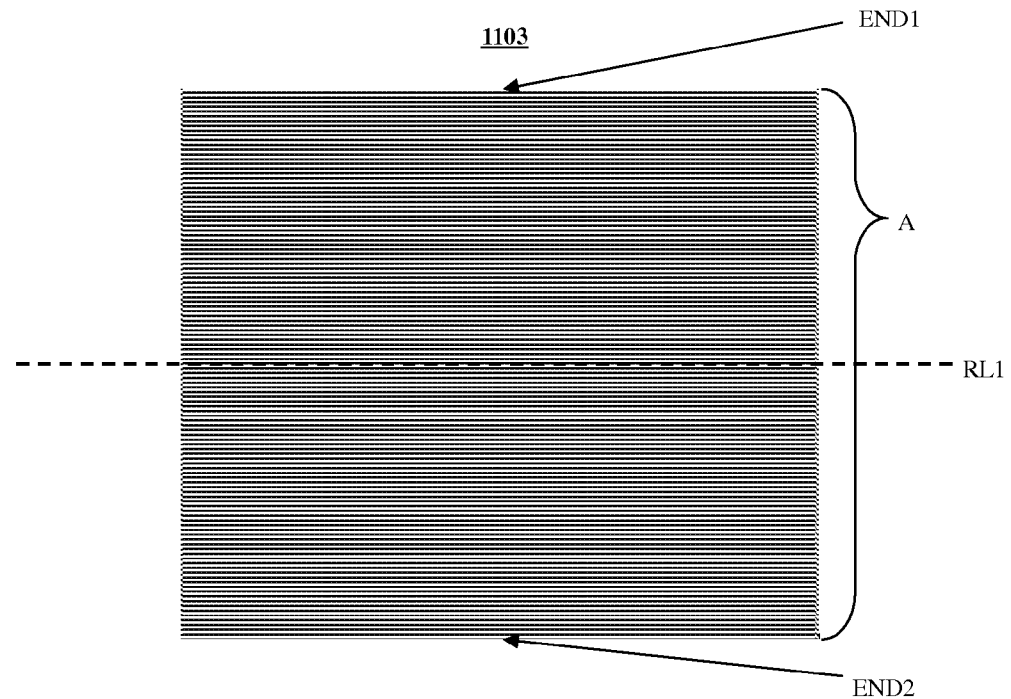
FIG. 3A is a schematic diagram showing the structure of a phase retardation plate used in an alignment method in accordance with an embodiment of the present invention.

In the embodiment of the present invention, a phase retardation plate 1103 is used, as shown in FIG. 3A, with a phase retardation area A comprising a plurality of strip-shaped phase retardation regions of equal width. The length of the strip-shaped phase retardation regions is along a horizontal direction, and their width is along a vertical direction. The strip-shaped phase retardation regions are adjacent to each other along the vertical direction, and any two adjacent strips have different phase retardation. For example, strip-shaped phase retardation regions with phase retardation of $\lambda/4$ and strip-shaped phase retardation regions with phase retardation of $-\lambda/4$ are alternately provided along the vertical direction. The upper end (a first end) and the lower end (a second end) along the vertical direction of the phase retardation area A are marked as END1 and END2.

Figure 4:
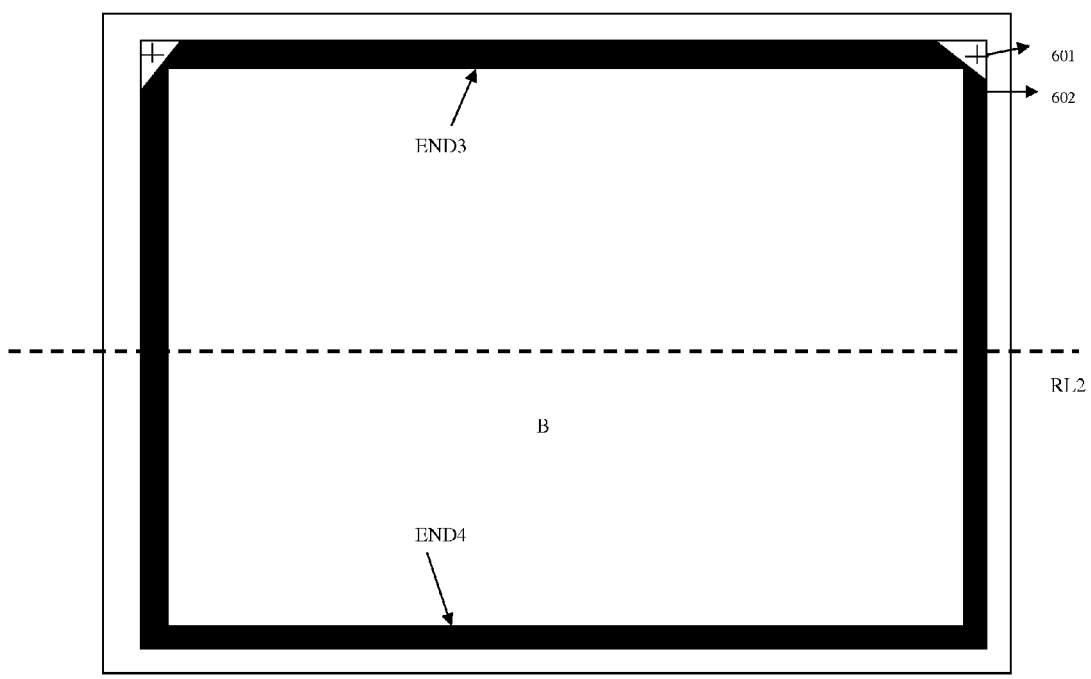
FIG. 4 is a schematic diagram showing the structure of a display panel used in an alignment method in accordance with an embodiment of the present invention.

A display panel used in the embodiment of the present invention, as shown in FIG. 4, includes a display area B and a peripheral region surrounding the display area B. The display area B comprises a plurality of strip-shaped display regions, corresponding respectively to the plural strip-shaped phase retardation regions of the phase retardation plate 1103. The upper end (a third end) and the lower end (a fourth end) of the display area B of the display panel 1105 are marked as END 3 and END 4, which correspond respectively to the upper end END1 and the lower end END2 of the phase retardation area A of the phase retardation plate 1103.

Figure 3B:
FIG. 3B is a schematic diagram showing the structure of the phase retardation plate of FIG. 3A provided with strip-shaped positioning regions.

Referring to FIG. 2 to FIG. 4 the alignment method includes the following steps:

S1: determining the positions of a first reference line RL1 of the phase retardation plate and a second reference line RL2 of the display panel, wherein the first reference line RL1 is the central line between the first end END1 and the second end END2 of the phase retardation area A, and the second reference line is the central line between the third end END 3 and the fourth end END 4 of the display area B.

S2: obtaining the positional deviation between the first reference line RL1 and the second reference line RL2.

S3: adjusting the position of the phase retardation plate or the display panel according to the positional deviation, so as to align the phase retardation plate with the display panel.

By using the alignment method in accordance with the embodiment of the present invention, the accuracy of the alignment between the phase retardation plate and the display panel can be considerably improved, hence achieving better 3D display effect by avoid the left and right image crosstalk.

By adjusting the relative positions of the phase retardation plate and the display panel according to the positional deviation between the horizontal center line of the phase retardation area A of the phase retardation plate and the horizontal center line of the display area B of the display panel, the alignment deviation can be reduced to a minimum, hence ensuring high accuracy in alignment.

Figure 8:
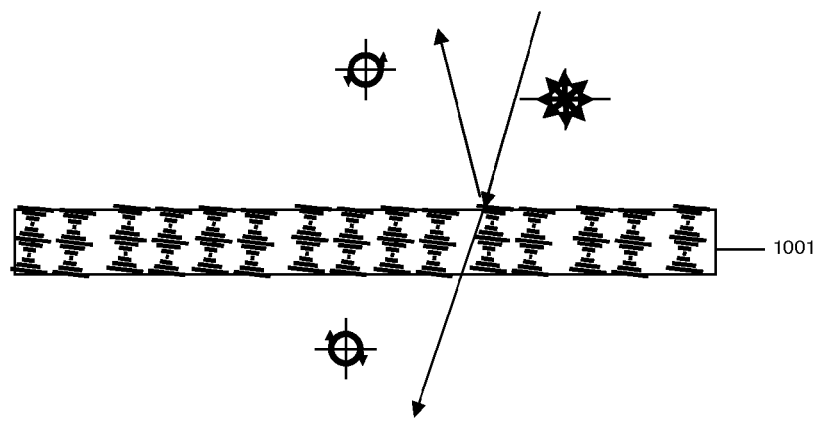
FIG. 8 is a schematic diagram of a circular polarizing filter used in an alignment method in accordance with an embodiment of the present invention.
Figure 9:
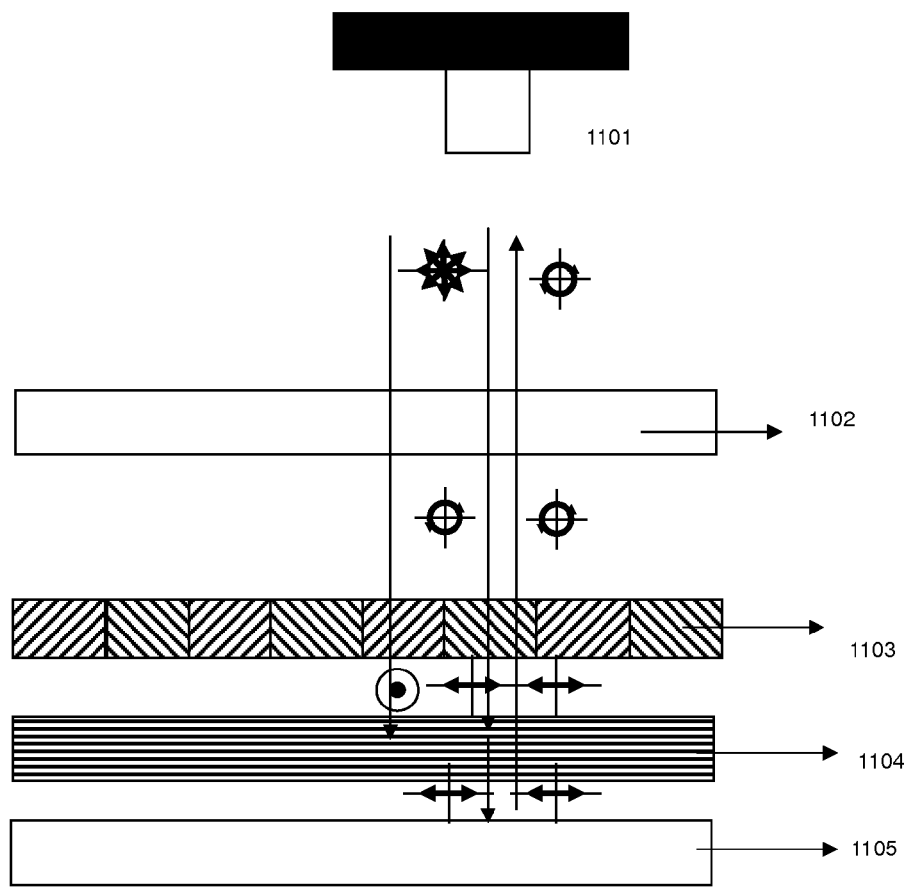
FIG. 9 is a schematic diagram of a CCD image sensor with a polarized plate used in an alignment method in accordance with an embodiment of the present invention.

With reference to FIG. 8 and FIG. 9, a method for determining the position of the first reference line RL1 on the phase retardation plate 1103, in accordance with an embodiment of the present invention, will be described in the following.

The coordinates of the first reference line RL1 can be determined by, for example, a CCD image sensor for polarized light, as it can detect the alternately bright and dark stripes corresponding to different strip-shaped phase retardation regions of the phase retardation plate 1103.

The CCD image sensor for polarized light described as above can be obtained by adding an auxiliary device such as a circular polarizing filter on an ordinary CCD image sensor. The CCD image sensor for polarized light can identify bright and dark stripes corresponding to strip-shaped phase retardation regions of a phase retardation plate by receiving polarized light passing through the circular polarizing filter such as a polarizing filter for left-hand or right-handed circularly polarized light.

The circular polarizing filter can also be formed by a linear polarizing plate and a $\lambda/4$ wave plate ($\lambda$ is the wavelength of the light to be imaged), wherein the angle between the polarization direction of the linear polarizing plate and the optical axis of the $\lambda/4$ wave plate is set at 45 degrees.

As shown in FIG. 8, the auxiliary device may also adopt a cholesterin liquid crystal layer 1001 in planar texture state. When an incident light beam (as shown by an asterisk) enters the cholesterin liquid crystal layer 1001, due to the circular dichroism of the cholesterin liquid crystal layer, a circularly polarized component (as shown by a counter-clockwise circle) is absorbed, and the other circularly polarized component (as shown by a clockwise circle) is allowed to pass through it.

As shown in FIG. 9, the operating principle of the CCD image sensor for polarized light, which can identify different strip-shaped phase retardation regions of a phase retardation plate, is described, for example, as follows.

Natural light (as shown by an asterisk) is converted into circularly polarized light (as shown by a counter-clockwise circle), after passing through the circular polarizing filter 1102. The circularly polarized light is further converted into two orthogonal linearly polarized components (as shown by a point circle and a double-headed arrow) after passing through different first and second strip-shaped phase retardation regions of the phase retardation plate 1103. One of the linearly polarized light components (as shown by a point circle), for example, having a polarization direction parallel to the absorption axis of upper polarizer 1104 provided on the display panel 1105 is absorbed completely. Hence, a dark strip corresponding to the first strip-shaped phase retardation region is seen by the CCD image sensor 1101. Another linearly polarized light component (as shown by a double-headed arrow) having a polarization direction parallel to the transmission axis of the upper polarizer 1104 provided on the display panel 1105 is allowed to pass through the upper polarizer 1104, keep its polarized direction after being reflected by the display panel 1105, pass through the upper polarizer 1104 again, returns to the circularly polarized light after passing the phase retardation plate 1103, and finally pass through the circular polarizing filter 1102. Hence, a bright strip corresponding to the second strip-shaped phase retardation region is seen by the CCD image sensor 1101. In this case, the CCD image sensor 1101 is capable of seeing alternately bright and dark strips corresponding to the first and second strip-shaped phase retardation regions of the phase retardation plate 1103.

Therefore, by using the CCD image sensor for polarized light, it is possible to measure and calculate the coordinates of the first reference line RL1 of the phase retardation area A of the phase retardation plate 1103.

Alternatively, as shown in FIG. 3A, the step of determining the position of the first reference line on the phase retardation plate can be performed to comprise the following steps.

Providing strip-shaped positioning regions (as shown by thick horizontal black stripes in FIG. 3B), which are of a width greater than the strip-shaped phase retardation regions, at the upper end END1 and the lower end END2 of the phase retardation area A of the phase retardation plate 1103; and detecting the positions of the strip-shaped positioning regions and calculate the position of the first reference line on the phase retardation plate.

In an embodiment, the strip-shaped positioning region provided at the upper end END1 has a phase retardation different from the strip-shaped phase retardation region adjacent thereto (i.e., the uppermost strip-shaped phase retardation region in the phase retardation area A); and the strip-shaped positioning region provided at the lower end END2 has a phase retardation different from the strip-shaped phase retardation region adjacent thereto (i.e., the bottommost strip-shaped phase retardation region in the phase retardation area A). Strip-shaped positioning regions, provided at the upper end END1 and the lower end END2 of phase retardation plate 1103, with a width larger than the strip-shaped phase retardation regions, are mainly used for aligning a phase retardation plate with a display panel, especially for controlling their alignment in the vertical direction, so as to reduce the alignment deviation in this direction to a minimum.

By using a image sensor such as the CCD image sensor for polarized light described as above, the positions of the strip-shaped horizontal positioning regions provided horizontally at the upper and lower ends of the phase retardation area A of the phase retardation plate is detected, and the position of the first reference line on the phase retardation plate can be obtained by calculation. As illustrated above with reference to FIG. 8 and FIG. 9, a CCD image sensor for polarized light can detect bright and dark strips correspond to, for example, different strip-shaped phase retardation regions composed of liquid crystal domains with different orientations; thus it can capture the coordinates of the first reference line on the phase retardation plate.

Alternatively, the step of determining the position of the first reference line on the phase retardation plate can be performed to comprise the following steps:

Providing phase retardation marks at regions of the phase retardation plate outside the phase retardation area A and corresponding to the four corners or center points of the vertical or horizontal lines of the phase retardation area A; detecting the positions of the phase retardation marks; and calculating the position of the first reference line on the phase retardation plate. By using the phase retardation marks described as above, the position of the first reference line on the phase retardation plate can be determined with greater accuracy.

The phase retardation marks and the strip-shaped positioning regions, for example, can be formed of the same material and by the same process as the phase retardation area A of the phase retardation plate. The phase retardation marks can be formed of photopolymerizable liquid crystal with two different domains. A bright-dark pattern of the phase retardation marks can be detected by a CCD image sensor for polarized light, so as to determine the coordinates of the center positions of the phase retardation marks.

As shown in FIG. 4, the step S2 of determining the position of the second reference line on the display panel, for example, includes the following steps:

Providing alignment marks 601, horizontally or vertically, on at least two corners of the peripheral region outside the display area B of the display panel; detecting the positions of the alignment marks 601 by using a image pickup such as a CCD image sensor. Since the distance between the alignment marks 601 and the second reference line RL2 is known in advance, the position of the second reference line RL2 on the display panel can be determined by calculation.

In order to more accurately determine the position of the starting point for the alignment and bonding between the phase retardation plate and the display panel, alignment marks 601 can be provided on the display panel. Since the phase retardation plate and the display panel are aligned single-sidedly, the alignment marks can be made of the same material as the black matrix (BM) 602, in the form of a cross or any other form.

Alternatively, the step of determining the position of the second reference line RL2 on the display panel can include the following steps:

Providing alignment marks in the peripheral region outside the display area B of the display panel and corresponding to the position of the second reference line RL2; detecting the positions of the alignment marks and determining the position of the second reference line RL2 on the display panel.

Alternatively, after the step S3, the alignment method, for example, further include the following steps:

Uniformly providing one or more confirmation mark(s) along two vertical lines or two horizontal lines, outside the display area of the display panel, correspond(s) respectively to the boundary line(s) between any two adjacent strip-shaped phase retardation regions of the phase retardation plate; assessing the accuracy of the alignment between the display panel and the phase retardation plate by the confirmation mark(s), and deciding whether the alignment is within an acceptable range or not.

Alternatively, the confirmation mark(s) may be made of metals, for example, the material of the gate line or data line of the display panel.

The confirmation mark(s) is/are provided in the peripheral region of the display panel, far away from the display area, and can be aligned with the phase retardation plate directly. Since the place for the confirmation mark(s) tends to be blocked by the black matrix (BM), it is necessary to form via hole(s) in the region(s) of BM corresponding to the confirmation mark(s), so as to facilitate the measurement of accuracy.

Figure 5:
FIG. 5 is a schematic diagram showing the structure of a display panel used in an alignment method in accordance with an embodiment of the present invention.

Alternatively, as shown in FIG. 5, the step of uniformly providing one or more confirmation mark(s) along two vertical lines or two horizontal lines outside the display area of the display panel can include the following steps:

Uniformly providing one or more via hole(s) 701 along the two vertical lines or two horizontal lines outside the display area of the display panel, correspond(s) respectively to the boundary line(s) between any two adjacent strip-shaped phase retardation regions of the phase retardation plate, placing the confirmation mark(s) respectively within via hole(s) 701.

Figure 6:
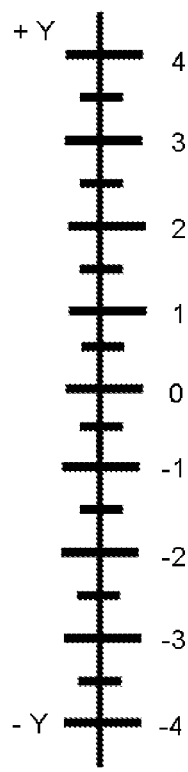
FIG. 6 is a schematic diagram showing the structure of confirmation marks used in an alignment method in accordance with an embodiment of the present invention.

The confirmation mark(s) is/are for example (a) scale mark(s), as shown in FIG. 6. The step of assessing the accuracy of the alignment between the display panel and the phase retardation plate by the confirmation mark(s), for example, comprises calculating the positional deviation of the boundary line(s) between two adjacent strip-shaped phase retardation regions of the phase retardation plate by using the scale mark(s).

The confirmation mark(s) is/are scale mark(s) capable of indicating error values. Its minimum graduation and range can be adjusted according to different requirements of alignment accuracy.

Figure 7:
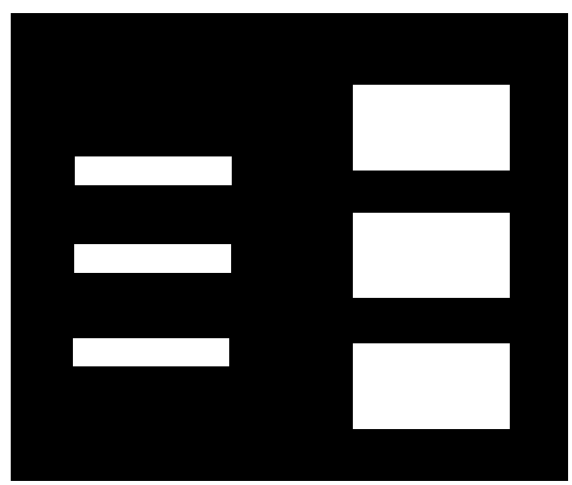
FIG. 7 is a schematic diagram showing the structure of confirmation marks used in an alignment method in accordance with an embodiment of the present invention.

The confirmation marks(s) is/are, for example, multiple groups of parallel slits of different widths, as shown in FIG. 7. The step of assessing the accuracy of the alignment between the display panel and the phase retardation plate by the confirmation mark(s), for example, comprises comparing the boundary lines between any two adjacent phase retardation regions of the phase retardation plate with the multiple groups of parallel slits of different widths.

If all the boundary lines between any two adjacent phase retardation regions of the phase retardation plate correspond to the slits of the smallest width, it means that the display panel and the phase retardation plate have been aligned with the greatest accuracy. Otherwise, they have been aligned with low accuracy.

In the step S2 shown in FIG. 2, the positional deviation between phase retardation plate 1103 and display panel 1105 is obtained, according to the coordinates of the positions of the first reference line RL1 and the second reference line RL2. In the step S3 shown in FIG. 2, for example, the relative position between the phase retardation plate 1103 and the display panel 1105 is adjusted according to the positional deviation obtained in the step S2 and by using the confirmation mark(s) 701 on display panel 1105. For example, in the case of a fixed phase retardation plate 1103 and a display panel 1105 on a movable carrier, the alignment and bonding of the phase retardation plate 1103 and the display panel 1105 can be achieved by moving the display panel 1105 on the movable carrier and by using the confirmation mark(s) 701.

Figure 10:
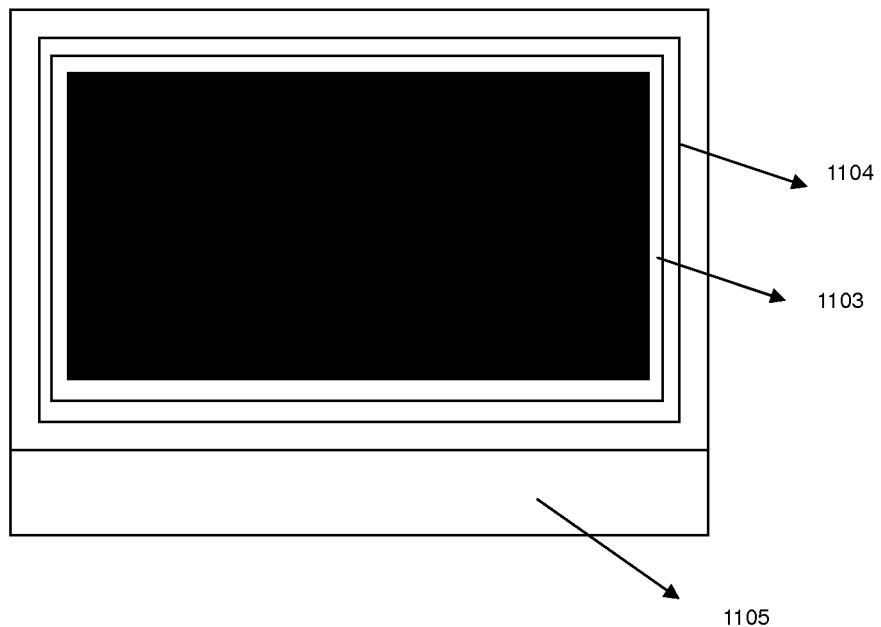
FIG. 10 and FIG. 11 are diagrams showing the relationship between a phase retardation plate and a display panel after alignment according to an alignment method provided by an embodiment of the present invention.
Figure 11:
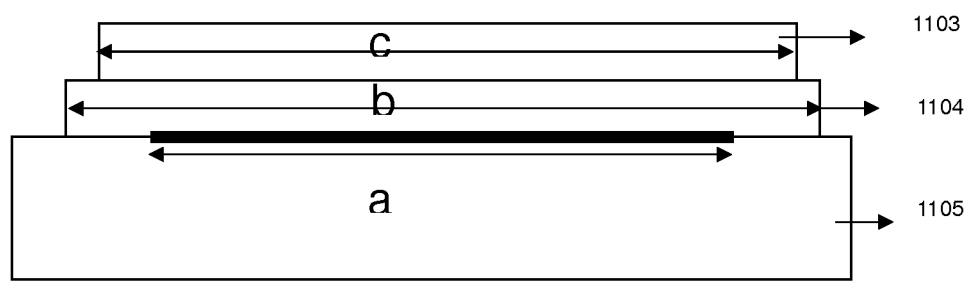

In an example, as shown in FIG. 10 and FIG. 11, the horizontal length of the display area of display panel 1105 is marked as "a"; the horizontal length of upper polarizer 1104 is marked as "b"; and the horizontal length of the phase retardation plate 1103 is marked as "c". To ensure satisfactory 3D display effect, it is necessary to keep b>c>a; namely, the size of the upper polarizer 1104 is larger than that of the display area of display panel 1105, and the size of the phase retardation plate 1103 attached to the upper polarizer 1104 is larger than that of the display area of the display panel 1105 but smaller than the upper polarizer 1104.

Although the phase retardation plate comprising a plurality of horizontal strip-shaped phase retardation regions and a display panel comprising a plurality of horizontal strip-shaped display regions are adopted, as an example, to illustrate the embodiments of the present invention in the above description, it should be understood that the alignment method provided by the embodiments of the present invention can also be used to align a phase retardation plate comprising a plurality of vertical strip-shaped phase retardation regions with a display panel comprising a plurality of vertical strip-shaped display regions.

The method for aligning a phase retardation plate with a display panel according to the embodiments of the present invention can considerably improve the accuracy of the alignment between the phase retardation plate and the display panel, hence reducing image crosstalk and achieve better 3D display effect.

According to the description above, embodiments of the present invention can provide at least the following methods:

(1) A method for aligning a phase retardation plate with a display panel, wherein the phase retardation plate has a phase retardation area comprising a plurality of strip-shaped phase retardation regions sequentially arranged in a width direction, any two adjacent strip-shaped phase retardation regions are different in phase retardation, the display panel has a display area comprising a plurality of strip-shaped display regions respectively corresponding to the strip-shaped phase retardation regions of the phase retardation plate and a peripheral region outside the display area, a first end and a second end, in the width direction, of the phase retardation area of the phase retardation plate are correspond respectively to a third end and a fourth end of the display area of the display panel, comprising the following steps:

S1: determining the positions of a first reference line on the phase retardation plate and a second reference line on the display panel, wherein the first reference line is the central line between the first and second ends of the phase retardation area, and the second reference line is the central line between the third and fourth ends of the display area;

S2: obtaining a positional deviation between the first reference line and the second reference line by calculation;

S3: adjusting the relative position between the phase retardation plate and the display panel according to the positional deviation.

(2) The method in accordance with (1), wherein the step of determining the position of the first reference line on the phase retardation plate includes the following steps:

detecting the position of the first reference line on the phase retardation plate by using an image pickup together with a circular polarizing filter and a linear polarizing plate, wherein the circular polarizing filter is provided between the phase retardation plate and the image picker, and the linear polarizing plate is provided between the phase retardation and the display panel.

(3) The method in accordance with (1) or (2), wherein the step of determining the position of the first reference line on the phase retardation plate includes the following steps:

providing a first strip-shaped positioning region and a second strip-shaped positioning region at the first and the second ends of the phase retardation area of the phase retardation plate, wherein, the first and second strip-shaped positioning regions are of widths larger than the strip-shaped phase retardation regions, and each of the first and second strip-shaped positioning regions is different in phase retardation from the strip-shaped phase retardation region adjacent thererto;

obtaining the position of the first reference line on the phase retardation plate, based on the positions of the first and second strip-shaped positioning region.

(4) The method in accordance with (1) or (2), wherein the step of determining the position of the first reference line on the phase retardation plate includes the following steps:

providing a phase retardation mark for indicating the position of the first reference line, on the phase retardation plate; detecting the positions of the phase retardation mark and obtaining the position of the first reference line by calculation.

(5) The method in accordance with (1) or (2), wherein the step of determining the position of the second reference line on the display panel includes the following steps:

providing alignment marks on at least two corners of the peripheral region of the display panel; detecting the positions of the alignment marks and obtaining the position of the second reference line on the display panel by calculation.

(6) The method in accordance with (1) or (2), wherein the step of determining the position of the second reference line on the display panel includes the following steps:

providing an alignment mark in the peripheral region of the display panel, wherein the alignment mark corresponds to the second reference line; detecting the position of the alignment marks and directly obtaining the position of the second reference line on the display panel.

(7) The method in accordance with (1), further comprising the following steps:

S4: providing a confirmation mark in the peripheral region of the display panel, wherein the confirmation mark corresponds to a boundary line between two adjacent strip-shaped phase retardation regions of the phase retardation plate;

S5: assessing alignment accuracy between the display panel and the phase retardation plate by using the confirmation mark; and adjusting the position of the phase retardation plate or the display panel based on the alignment accuracy.

(8) The method in accordance with (7), wherein the step S4 includes the following steps:

providing a via hole in the peripheral region of the display panel, wherein the via hole corresponds to the boundary line between the two adjacent strip-shaped phase retardation regions of the phase retardation plate; and placing the confirmation mark within the via hole.

(9) The method in accordance with (7), wherein the confirmation mark is a scale mark, and the step S5 includes assessing the alignment accuracy by measuring the deviation between the scale mark and the boundary line between the two adjacent strip-shaped phase retardation regions of the phase retardation plate.

(10) The method in accordance with (8), wherein the confirmation marks include multiple groups of parallel slits of different widths, and the step S5 includes assessing the alignment accuracy by comparing the boundary lines between the two adjacent phase retardation regions of the phase retardation plate with the slits of different widths.

(11) The method in accordance with (10), wherein the confirmation mark includes two groups of parallel slits of different widths.

Although the present invention has been described in considerable detail with reference to particular embodiments thereof, some modifications or improvements can also be made on the basis of the present invention, which is evident to those skilled in the art. Therefore, the modifications or improvements, which are made without departing from the spirit of the present invention, all belong to the protection scope of the present invention.

What is claimed is:

1. A method for aligning a phase retardation plate with a display panel, wherein the phase retardation plate has a phase retardation area comprising a plurality of strip-shaped phase retardation regions sequentially arranged in a width direction, any two adjacent strip-shaped phase retardation regions are different in phase retardation, the display panel has a display area comprising a plurality of strip-shaped display regions respectively corresponding to the strip-shaped phase retardation regions of the phase retardation plate and a peripheral region outside the display area, a first end and a second end, in the width direction, of the phase retardation area of the phase retardation plate are correspond respectively to a third end and a fourth end of the display area of the display panel, comprising the following steps:

S1: determining the positions of a first reference line on the phase retardation plate and a second reference line on the display panel, wherein the first reference line is the central line between the first and second ends of the phase retardation area, and the second reference line is the central line between the third and fourth ends of the display area, wherein the step of determining the positions of the first reference line on the phase retardation plate is performed by using a CCD image sensor for polarized light which is capable of detecting alternately bright and dark stripes corresponding to the respective strip-shaped phase retardation regions of the phase retardation plate;

S2: obtaining a positional deviation between the first reference line and the second reference line by calculation;

S3: adjusting the relative position between the phase retardation plate and the display panel according to the positional deviation, so as to align the phase retardation plate with the display panel, wherein the CCD image sensor for polarized light comprises a image pickup device, a circular polarizing filter and a linear polarizing plate, wherein the circular polarizing filter is provided between the phase retardation plate and the image picker, and the linear polarizing plate is provided between the phase retardation and the display panel.

2. The method in accordance with claim 1, wherein the step of determining the position of the first reference line on the phase retardation plate includes the following steps:

providing a first strip-shaped positioning region at the first end of the phase retardation area of the phase retardation plate, and a second strip-shaped positioning region at the second end of the phase retardation area of the phase retardation plate, wherein, the first and second strip-shaped positioning regions are of widths larger than the strip-shaped phase retardation regions, and each of the first and second strip-shaped positioning regions is different in phase retardation from the strip-shaped phase retardation region adjacent thereto;

obtaining the position of the first reference line on the phase retardation plate based on the positions of the first and second strip-shaped positioning regions detected by using the CCD image sensor for polarized light.

3. The method in accordance with claim 1, wherein the step of determining the position of the first reference line on the phase retardation plate includes the following steps:

providing a phase retardation mark for indicating the position of the first reference line, on the phase retardation plate; detecting the position of the phase retardation mark by using the CCD image sensor for polarized light and obtaining the position of the first reference line by calculation.

4. The method in accordance with claim 1, wherein the step of determining the position of the second reference line on the display panel includes the following steps:

providing alignment marks on at least two corners of the peripheral region of the display panel; detecting the positions of the alignment marks and obtaining the position of the second reference line on the display panel by calculation.

5. The method in accordance with claim 1, wherein the step of determining the position of the second reference line on the display panel includes the following steps:

providing an alignment mark in the peripheral region of the display panel, wherein the alignment mark corresponds to the second reference line; detecting the position of the alignment marks and directly obtaining the position of the second reference line on the display panel.

6. The method in accordance with claim 1, further comprising the following steps:

S4: providing a confirmation mark in the peripheral region of the display panel, wherein the confirmation mark corresponds to a boundary line between two adjacent strip-shaped phase retardation regions of the phase retardation plate.

S5: assessing alignment accuracy between the display panel and the phase retardation plate by using the confirmation mark; and adjusting the position of the phase retardation plate or the display panel based on the alignment accuracy.

7. The method in accordance with claim 6, wherein the step S4 includes the following steps:

providing a via hole in the peripheral region of the display panel, wherein the via hole corresponds to the boundary line between the two adjacent strip-shaped phase retardation regions of the phase retardation plate, wherein the confirmation mark is provided within the via hole.

8. The method in accordance with claim 7, wherein the confirmation mark is a scale mark, and the step S5 includes assessing the alignment accuracy by measuring the deviation between the scale mark and the boundary line between the two adjacent strip-shaped phase retardation regions of the phase retardation plate.

9. The method in accordance with claim 7, wherein the confirmation marks include multiple groups of parallel slits of different widths, and the step S5 includes assessing the alignment accuracy by comparing the boundary lines between the two adjacent phase retardation regions of the phase retardation plate with the slits of different widths.

10. The method in accordance with claim 9, wherein the confirmation mark includes two groups of parallel slits of different widths.

* * * * *